Sept. 27, 1949.  G. W. LENNY, JR., ET AL  2,482,782
PULSE DISCRIMINATION SYSTEM
Filed Feb. 13, 1947  2 Sheets-Sheet 1
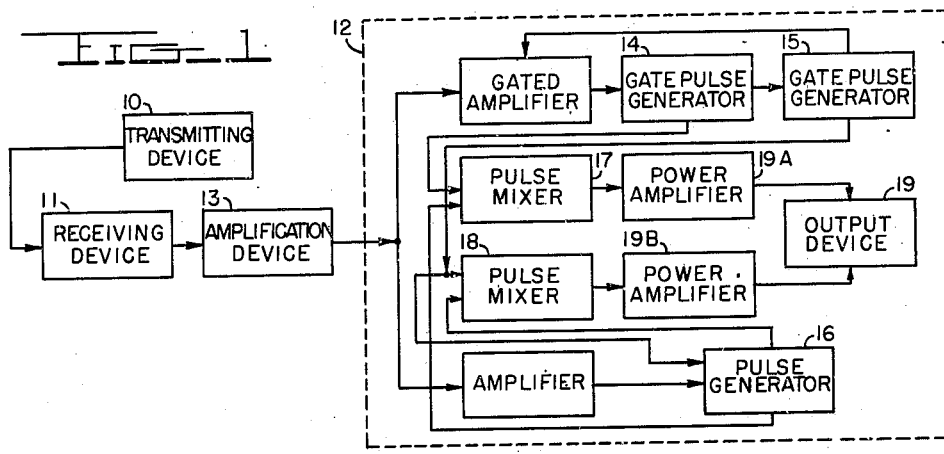
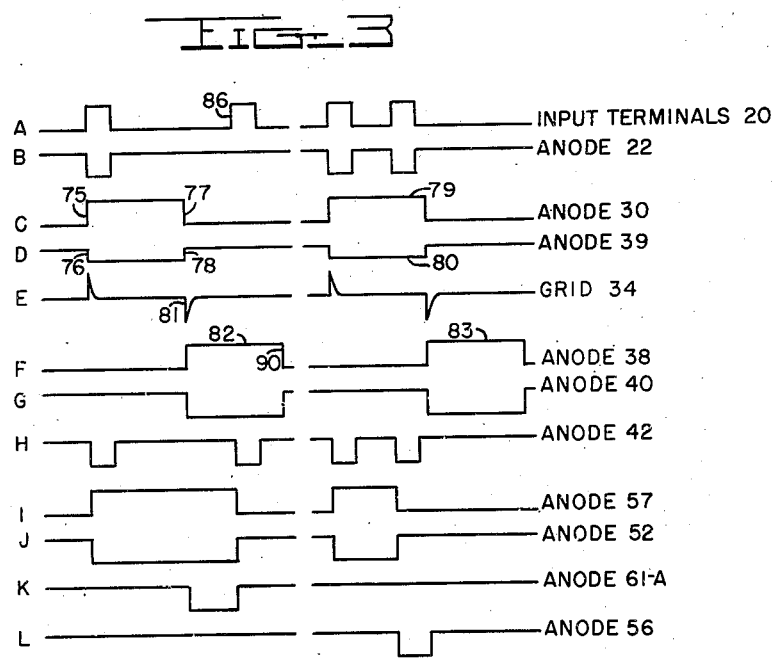
Inventor
GEORGE W. LENNY JR.
PAUL E. WARD
By
Attorney

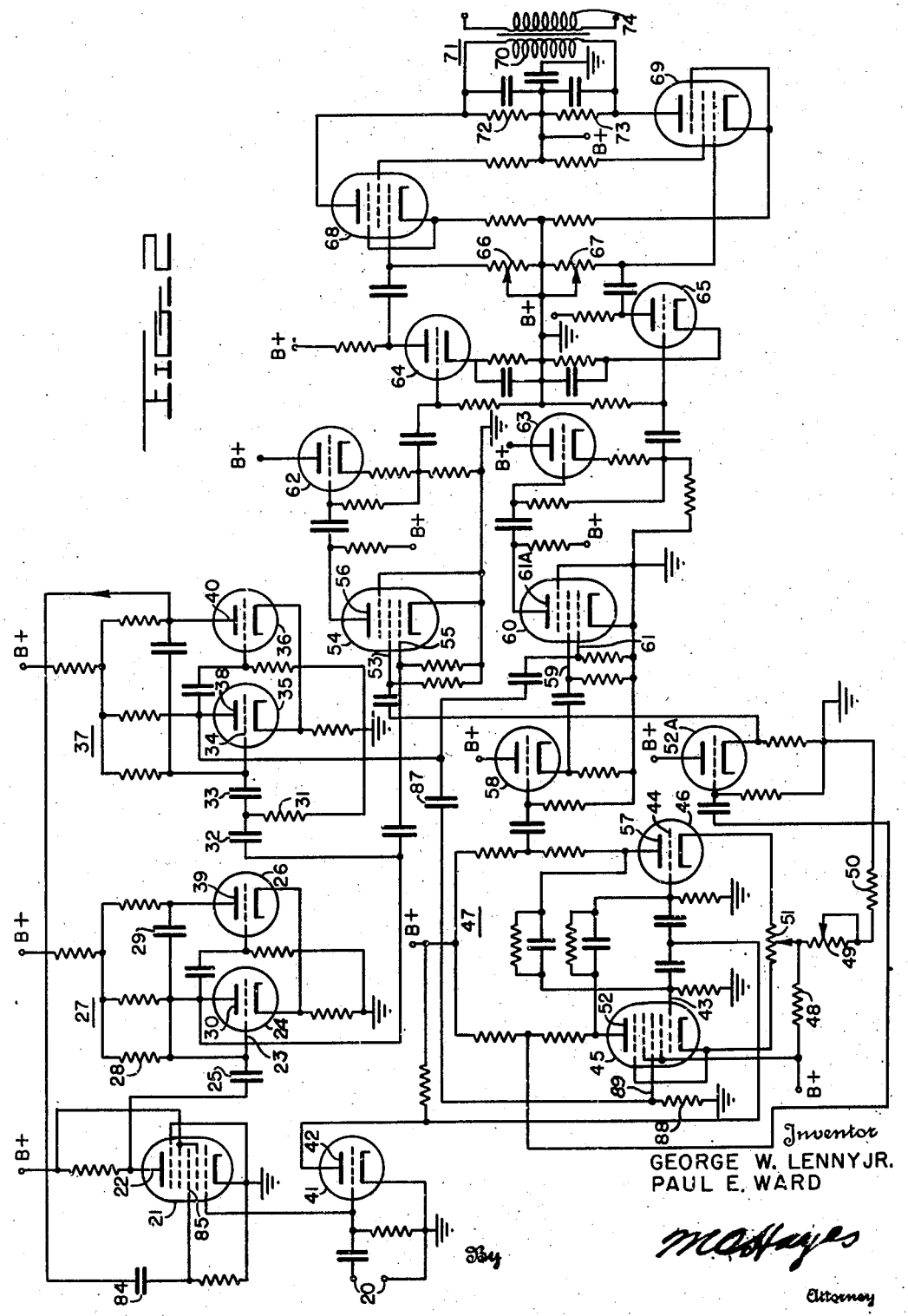

Patented Sept. 27, 1949

2,482,782

UNITED STATES PATENT OFFICE 2,482,782

PULSE DISCRIMINATION SYSTEM

George W. Lenny, Jr., and Paul E. Ward,
United States Naval Reserve

Application February 13, 1947, Serial No. 728,212

3 Claims. (Cl. 250—27)

(Granted under the act of March 3, 1883, as
amended April 30, 1928; 370 O. G. 757)

This invention relates to pulse discrimination systems and in particular to a system for producing amplitude varying signals in dependency on repetitive multiple pulse signals applied thereto.

Frequently it is desirable to produce amplitude varying signals in response to recurrence frequency modulated pulse-type signals. Such a situation would arise in the case of a signaling system employing repetitive pulsed energy with variation in the time spacing between selected pulses to convey intelligence. Typical of such a system is a transmitting and receiving system in which intelligence is applied to repetitive pulse pairs by selective variation of the pulse interval between the individual pulses of the pairs of pulses. To reproduce the transmitted intelligence in the form of intelligible signals, a decoder or discrimination system must be employed in conjunction with the receiving system.

Accordingly it is an object of this invention to provide a system for producing amplitude varying signals in response to repetitive multiple pulse signals having selectable pulse intervals.

Another object is to provide a discrimination system responsive to repetitive pairs of pulses to produce amplitude varying signals in dependency thereon.

A further object is to provide a discrimination system for producing signals having amplitudes and polarity in dependency on repetitive multiple pulses having variable pulse intervals applied thereto.

Other and further objects and features of the present invention will become apparent upon a careful consideration of the following detailed description when taken together with the accompanying drawings which illustrate a typical embodiment of the invention and the manner in which that embodiment may be considered to operate.

Fig. 1 is a block diagram showing the general features of the present invention as employed in combination with transmitting and receiving devices.

Fig. 2 is a schematic diagram of a specific circuit designed to perform functions as hereinbefore outlined.

Fig. 3 shows waveforms taken to illustrate the operation of the circuit of Fig. 2.

With reference to Fig. 1 a system is shown which is representative of one embodiment of the invention and which is adapted to operate on a group of repetitive pulses in such a manner that multiple pulse signals may be utilized to produce an amplitude varying signal in dependency on time spacing characteristics of the multiple pulses.

A transmitting device 10 represents any energy source preferably adapted to produce a pair of radio frequency pulses having selectable time spacing at a given repetitive frequency. A part of the energy produced by transmitting device 10 is radiated outward and intercepted by receiving device 11. Any conventional receiver adapted to pulse energy reception may be employed in receiving device 11. The intercepted energy is applied to the discrimination system 12 after being amplified in a conventional amplification device 13.

A first pulse of a pair of received energy pulses triggers a first gate pulse generator 14 which subsequently causes operation of a second gate pulse generator 15. The second pulse of the pair of received energy pulses causes operation of a control pulse generator 16 to produce a pair of polarity opposed control signals. The output signal of the first gate pulse generator 14 is combined with a first one of the polarity opposed control signals from control pulse generator 16 in a pulse mixer 17.

Similarly, the output signal of the second gate pulse generator 15 is combined with the second of the polarity opposed control signals from control pulse generator 16 in pulse mixer 18.

An output device 19 operatively connected to pulse mixer 17 and 18 utilizes the outputs therefrom in such a manner as to produce amplitude varying signals in dependency upon the phase characteristics of the pair of pulses intercepted by receiving device 11.

In particular, the pulse discrimination system 12 as typified by the example shown in Fig. 2 includes input terminals 20 to which are applied repetitive multiple pulse signals intercepted by receiving device 11. These multiple pulse signals as hereinbefore mentioned preferably comprise a pair of pulses having selectable time spacing. The intercepted pulses having been amplified in amplification device 13 appear at input terminals 20 as positive pulses of energy.

Application of a pair of positive pulses to a control grid electrode of an amplifier 21 results in negative voltage excursions at anode 22 of amplifier 21. Negative pulses formed at the anode 22 are applied to a grid 23 of a resistance-capacitance coupled amplifier 24 through a coupling capacitive element 25. Resistance-capacitance coupled amplifier 24 together with a second amplifier 26 make up a conventional one-shot multivibrator 27 in which tube 24 is normally conductive because of the connection of grid 23 to the anode supply potential through grid resistive element 28. Application of a negative pulse to grid 23 alters this condition producing anode current flow in tube 26. This conductive condition of tube 26 is maintained until capacitive element 29 discharges sufficiently to permit the grid 23 to rise above cutoff resulting in anode current flow in tube 24. Accordingly, impression of a negative pulse on grid 23 of tube 24 results in the formation at the anode 30 of tube 24 of a positive pulse having a preselected duration. The duration of the output pulses formed at the anode 30 of tube 24 is substantially dependent upon the values of capacitive element 29, grid resistive element 28, and the potential to which the grid 23 is connected through resistive element 28.

The anode 30 of tube 24 is operatively connected through a differentiating network comprising resistive element 31 and capacitive elements 32 and 33 to a grid 34 of a resistance-capacitance coupled amplifier 35. Amplifier 35 is operatively connected to a similarly constructed amplifier 36 and forms a one-shot multivibrator 37 in which tube 35 is normally conductive. Multivibrator 37 is preferably similar in construction and thus operable in the same manner as multivibrator 27. A positive pulse formed at the anode 30 of tube 24 and coupled through the differentiating network having elements 31, 32, 33 appears at the grid 34 of tube 35 as first and second voltage pips coincident respectively with the leading and trailing edges of the positive pulse formed at anode 30, the first voltage pip of a positive polarity and the second voltage pip of a negative polarity. Only negative voltage excursions impressed on grid 34 will initiate regenerative switching action in multivibrator 37, therefore a positive pulse will be produced at anode 38 of tube 35 immediately following the production of a positive pulse at anode 30 of tube 24. Circuit elements of multivibrator 37 are preferably selected so that positive pulses formed at anode 38 are of the same duration as pulses formed at anode 30 of tube 24. It should be noted that voltage pulses will be formed at anode 39 of tube 26 and anode 40 of tube 36 coincident respectively with the formation of pulses at anode 30 and anode 38, the pulses formed at the corresponding anodes of either multivibrator being of opposite polarity.

Signals applied to input terminals 20 are coupled into a conventional amplifier 41 as well as to amplifier 22. Anode 42 of tube 41 is coupled to grids 43 and 44 of tubes 45 and 46 respectively. Tubes 45 and 46 are operatively connected to form an Eccles-Jordan type trigger circuit 47. In the quiescent state before the application of pulses to trigger circuit 47, tube 46 is conducting current whereas tube 45 is maintained with anode current cutoff. Output from tube 41 in the form of negative voltage pulses applied simultaneously to grids 43 and 44 will have no direct effect on the non-conducting tube 45. However a negative voltage pulse of sufficient amplitude will cause the grid 44 of the conducting tube 46 to drop below cutoff. Regenerative switching action of trigger cricuit 47 causes the grid 43 to rise above cutoff initiating a flow of anode current in tube 45 simultaneously with the cutoff of anode current in tube 46. Voltage divider action of resistances 48, 49, and 50 together with variable resistive element 51 affords a means of applying required biasing voltages to tube 43 and 44 to obtain the desired operation of the trigger circuit 47 as described above.

The anode 52 of tube 45 is connected through an impedance matching device 52—A to a screen grid 53 of a coincidence tube 54. Impedance matching device 52—A may be a conventional cathode follower network employed to prevent capacitive loading of trigger circuit 47 by grid 53 and associated leads. The anode 30 of multivibrator 27 is coupled to the control grid 55 of coincidence tube 54. In the quiescent state before applying signals to coincidence tube 54, anode current does not flow therein by reason of low voltage on grids 53 and 55. In order to produce anode current flow in tube 54, positive polarity signals must be simultaneously applied to the screen grid 53 and control grid 55.

Since tube 45 is normally nonconducting, a positive signal is normally applied to grid 33, since tube 24 is normally conducting, a negative signal is normally applied to grid 55 and tube 54 will not conduct. Tube 54 will therefore conduct during such perids as tubes 24 and 45 are simultaneously nonconducting.

In a similar manner anode 57 of tube 46 is connected through impedance matching device 58 to the screen grid 59 of a second coincidence tube 60. The anode 38 of multivibrator 37 is connected to the control grid 61 of tube 60. Simultaneous impression of positive polarity signals from anode 38 of multivibrator 37 and anode 57 of trigger circuit 47 is required to obtain an output from coincidence tube 60. Signals produced at the anodes of coincidence tube 54 and 60, respectively, are coupled through impedance matching devices 62 and 63 to conventional amplifiers 64 and 65. Low input capacitance of the cathode follower circuits employed as impedance matching devices 62, 63 improves the operation of pulse mixers 54, 60. Amplifiers 64 and 65 are preferably of similar construction thus simplifying adjustments thereof. Potentiometers 66, 67 in the anode circuits of amplifiers 64, 65 respectively serve as a means of equalizing the output signals from amplifiers 64, 65 for given signals applied thereto. Such an adjustment is necessary to minimize signal distortion in the output of the discrimination system 12.

Tubes 68 and 69, which may be any conventional type power amplifiers connected in push-pull, are driven from the outputs of amplifiers 64 and 65 respectively. The primary winding 70 of an output transformer 71, connected across anode load resistances 72, and 73, provides an integrating impedance network for the anode circuit. Signals applied to power amplifiers 68 and 69 are compared and an averaged output is obtained across secondary winding 74 of output transformer 71.

In order that the operation of the specific embodiment shown in Fig. 2 may be more readily understood, it will now be described by way of example with reference to the waveforms shown in Fig. 3.

Repetitive multiple pulse signals emitted by transmitting device 10 and intercepted by receiving device 11 comprise a pair of positive energy pulses having selectable pulse interval as mentioned hereinbefore. Typical of the energy received and applied to input terminals 20 for discrimination is waveform A of Fig. 3. For purposes of illustration two multiple pulse signals are shown comprising a first pair of pulses and a second pair of pulses having a pulse interval less than that of the first pair of pulses. Resulting pulses at the anode 22 are shown in waveform B. The first negative pulse coupled through capacitance 25 to grid 23 of amplifier 24 causes anode current cutoff in tube 24 and regenerative action of multivibrator 27 causes anode current flow in tube 26. Thus a positive voltage excursion at anode 30 and a negative voltage excursion at anode 39 results as indicated by numerals 75 of waveform C and 76 of waveform D respectively. The above conduction state of multivibrator 27 is maintained until the potential of grid 23 rises above cutoff, causing tubes 24, 26 to return to the quiescent state condition as indicated by numerals 77 and 78 of waveforms C and D respectively. The first pulse of the second pair of pulses applied to terminals 20 will result in similar pulse formation at anodes 30 and 39 as indicated by numerals 79 and 80 of waveforms C and D respectively.

Pulses from anode 30 of tube 24 are coupled through differentiating network 31, 32, 33 to the grid 34 of tube 35. Action of the differentiating network 31, 32, 33 on the pulses shown in waveform C results in the production of voltage pips coincidental with the leading and trailing edges of the pulses as shown by waveform E. In the quiescent state current flow in tube 35 of multivibrator 37 is maintained as described hereinbefore, therefore the first negative pip indicated by numeral 81 in waveform E will interrupt current flow in tube 35. This non-conductive condition of tube 35 will be maintained until the potential of grid 34 rises above a definite voltage at which time conduction conditions of multivibrator 37 as were existing during the quiescent state will be re-established. In accordance with the above discussion positive pulses indicated by numerals 82, 83 in waveform F will be produced at anode 38. Regenerative switching action of multivibrator 37 results in the formation of negative pulses at anode 40 as shown in waveform G coincidental with pulses 82, 83 of waveform F.

To prevent the interruption of anode current flow in tube 24 by the second pulse of a pair of pulses applied to input terminals 20, anode 40 of tube 36 is coupled through a D. C. blocking capacitance 84 to a second control grid 85 of amplifier 21. The potential at anode 40 of tube 36 drops as shown by waveform G following the initiation of current flow in tube 24. This drop in potential is conveyed to grid 85, rendering amplifier 21 non-responsive to signals applied thereto during an interval of time after tube 24 has returned to a state of anode current conduction. Thus the second pulse indicated by numeral 86 of waveform A does not cause operation of multivibrator 27. Since pulse 86 is applied to amplifier 21 after tube 24 has returned to a quiescent condition, it does not appear in the output of amplifier 21 as shown in waveform B.

Pulses applied to terminals 20 are also applied to amplifier 41 as hereinbefore described. Negative pulses produced at anode 42 of amplifier 41 as shown in waveform H are coupled into grids 43 and 44 of trigger circuit 47. Since tube 45 is maintained non-conductive in the quiescent state, negative pulses applied to grid 43 have no effect. However, conduction by tube 46 will be cutoff by a negative pulse of sufficient amplitude. Regenerative switching action raises grid 43 of tube 45 above cutoff, thus initiating current flow therein. The above conditions initiated by the first one of a pair of pulses applied to trigger circuit 47 are maintained until a second negative pulse is applied thereto. The second negative pulse causes reverse switching action, thus interrupting conduction by anode 52 of tube 45 simultaneously with the initiation of conduction by tube 46. The above described switching action resulting from the application of two successive negative pulses to trigger circuit 47, produces a positive pulse at anode 57 of tube 46 and a coincidental negative pulse at anode 52 of tube 45 as shown in waveforms I and J respectively, the duration of the pulses so formed being dependent upon the time interval between the pair of pulses applied to trigger circuit 47.

To insure that anode current in tube 45 is cutoff prior to application of the first negative pulse to grid 43 thereof, the anode 38 of tube 35 is connected through a differentiating network, comprising capacitance 87 and resistance 88 to a second control grid 89 of tube 45. Positive pulses formed at anode 38 of tube 35 as shown in waveform F are differentiated by capacitance 87 and resistance 88 to produce a negative voltage excursion in time phase with the trailing edge 90 of pulse 82. This negative voltage excursion applied to grid 89 of tube 45 causes anode current cutoff therein resulting in regenerative switching of trigger circuit 47. If tube 45 is in the nonconducting quiescent state, the negative voltage excursion will have no effect thereon. Disturbance of the operation of the discrimination system by random noise is thus minimized.

As is apparent from waveform I, anode 57 of tube 46 is positive during the interval between the leading edges of a pulse pair. This voltage is applied to one grid 59 of coincidence tube 60. Anode 38 of tube 35 is positive during the second of a pair of equal periods. The first period is initiated by the leading edge of the first pulse, as shown in waveforms C and D, and the second begins with the initiation of conduction in tube 36 in response to the end of the first period, as previously described and shown in waveforms F and G. Since the positive voltage F from anode 38 is applied to the other grid 61 of coincidence tube 60, it follows that when the second input pulse 86 of the pair of pulses shown in waveform A occurs after the initiation of conduction in tube 36, the high positive potential of the grid 59 and the grid 61 will cause conduction by coincidence tube 60 in the time interval between the initiation of conduction by tube 36 and the arrival of the second pulse. This is indicated in waveform K which represents the voltage at the anode 61-A. Similarly, anode 52 of tube 45 is positive except during the interval between a pulse pair, as shown in waveform J. This voltage is applied to grid 53 of coincidence tube 54. Anode 30 of tube 24 is positive during the first of said pair of equal periods as shown in waveform C. This voltage is applied to the other grid 55 of coincidence tube 54. Therefore, whenever the second pulse of the pair of input pulses occurs before the initiation of conduction in tube 36, the high positive potential of the grid 53 and the grid 55 will cause conduction by coincidence tube 54 in the time interval between the occurrence of the second pulse and the initiation of conduction by tube 36. This operation is shown in waveform L.

Upon recurrence of either of the above conductive conditions a recurrent voltage drop across the appropriate resistance 72 or 73 will cause impression of a signal of one polarity across primary winding 70 in amplitude dependency on the duration of each conductive period. Occurrence of the other conductive conduction at another instant in time will result in the impression of a signal of opposite polarity across primary winding 70.

In summation the discrimination system 12 derives output signals having selectable amplitudes and polarities dependent upon the pulse interval of repetitive pairs of pulses applied thereto.

From the foregoing discussion it is apparent that considerable modification of the features of this invention is possible and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In combination with a receiving device for the reception of repetitive multiple pulse signal, a pulse discrimination system comprising; a pulse generator for deriving a pulse signal in response to input signals, a first gate pulse generator operable to produce a first gating signal upon reception of a first pulse signal, a second gate pulse generator responsive to the conclusion of the first gating signal to produce a second gating signal, a first coincidence circuit for producing a first output signal responsive to the attainment of selected time relationships between the operation of the pulse generator and the first gating pulse signal, a second coincidence circuit for producing a second output signal responsive to the attainment of selected time relationships between the operation of the pulse generator and the second gate pulse generator, and means combining the first and second output signal in amplitude opposition.

2. In combination with a receiving device for the reception of repetitive multiple pulse signals, a pulse discriminator system, comprising; a first trigger circuit having two stable conductivity states, coupling means producing trigger operation of the first trigger circuit in response to received pulse signals, a first gate generator operable to produce a first gating signal upon reception of a first pulse signal, a second gate pulse generator responsive to the conclusion of the first gating signal to produce a second gating signal, a first coincidence circuit for producing a first output signal responsive to the attainment of selected time relationships between the operation of the pulse generator and the first gate pulse generator, a second coincidence circuit for producing a second output signal responsive to the attainment of selected time relationships between the operation of the pulse generator and the second gate pulse generator, and means combining the first and second output signal in amplitude opposition.

3. In combination with a receiving device for the reception of repetitive multiple pulse signals, a pulse discriminator system, comprising; a first trigger circuit having first and second stable conductivity states, coupling means producing trigger operation of the trigger circuit in response to received pulse signals, a second trigger circuit having one stable conductivity state and one unstable conductivity state, means initiating the unstable conductivity state therein in response to a first received pulse signal, a third trigger circuit having one stable conductivity state and one unstable conductivity state, means initiating the unstable state in the third trigger circuit in response to the return of the second trigger circuit to its stable state, first coincidence means responsive to simultaneous existence of the first state in the first trigger circuit and the unstable conductivity state in the second trigger circuit, second coincidence means responsive to simultaneous existence of the second state of the first trigger circuit and the unstable state in the third trigger circuit, and means combining the output signal from the first and second coincidence means in amplitude opposition.

GEORGE W. LENNY, Jr.
PAUL E. WARD.

REFERENCES CITED

The following references are of record in the file of this patent:

UNITED STATES PATENTS

| Number | Name | Date |
|---|---|---|
| 2,089,639 | Bedford | Aug. 10, 1937 |
| 2,359,447 | Seeley | Oct. 3, 1944 |
| 2,413,023 | Young | Dec. 24, 1946 |
| 2,416,088 | Deerhake | Feb. 18, 1947 |
| 2,416,306 | Grieg | Feb. 25, 1947 |
| 2,426,187 | Earp | Aug. 26, 1947 |